Nov. 15, 1955   F. J. WETZEL   2,723,792
MILK CAN UNLOADER AND RE-COVERING UNIT
Filed Sept. 19, 1952   9 Sheets-Sheet 2

Inventor:
Fred J. Wetzel
by his Attorneys,
Darby + Darby

Nov. 15, 1955 F. J. WETZEL 2,723,792
MILK CAN UNLOADER AND RE-COVERING UNIT
Filed Sept. 19, 1952 9 Sheets-Sheet 3

Inventor:
Fred J. Wetzel
by his Attorneys,
Darby & Darby

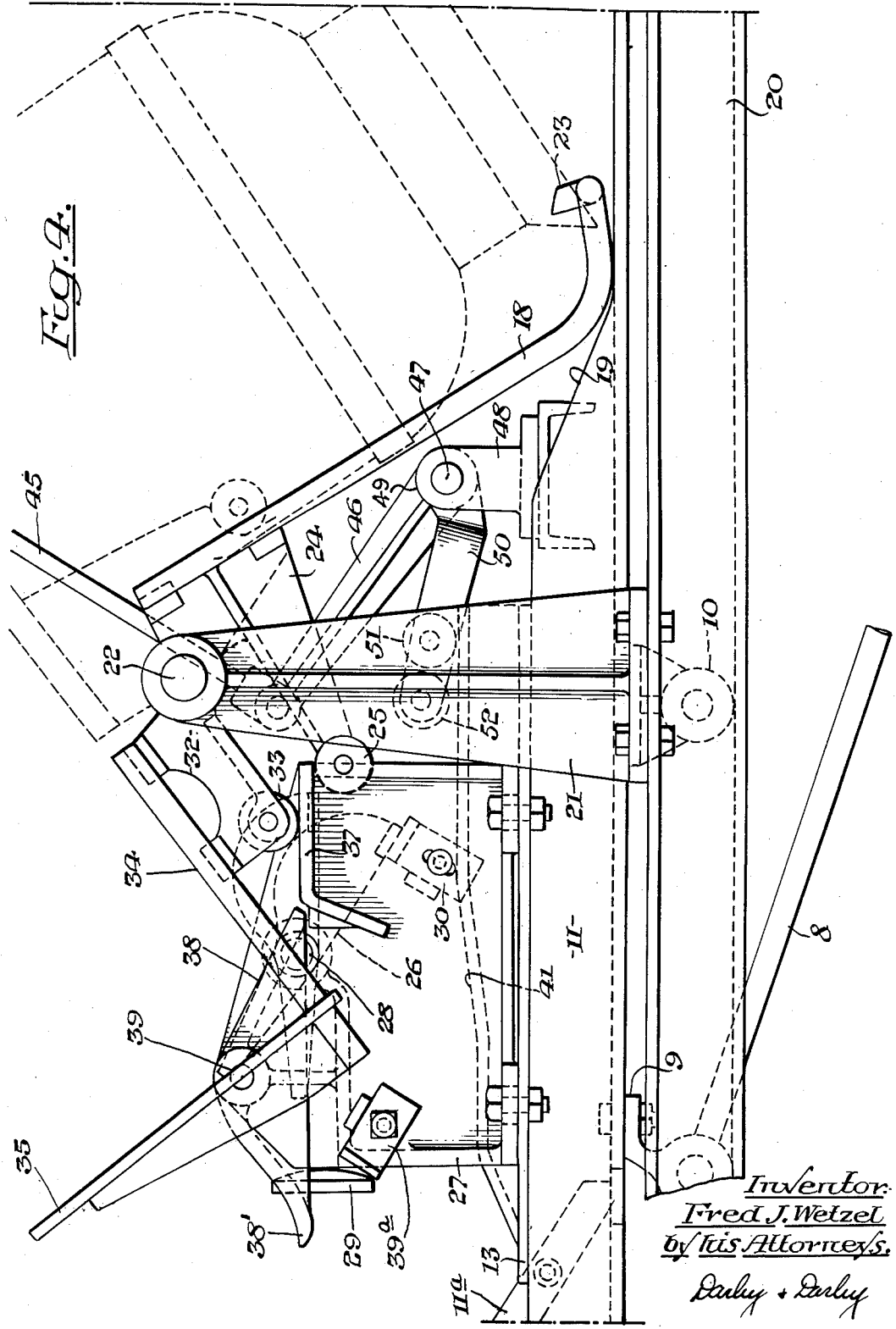

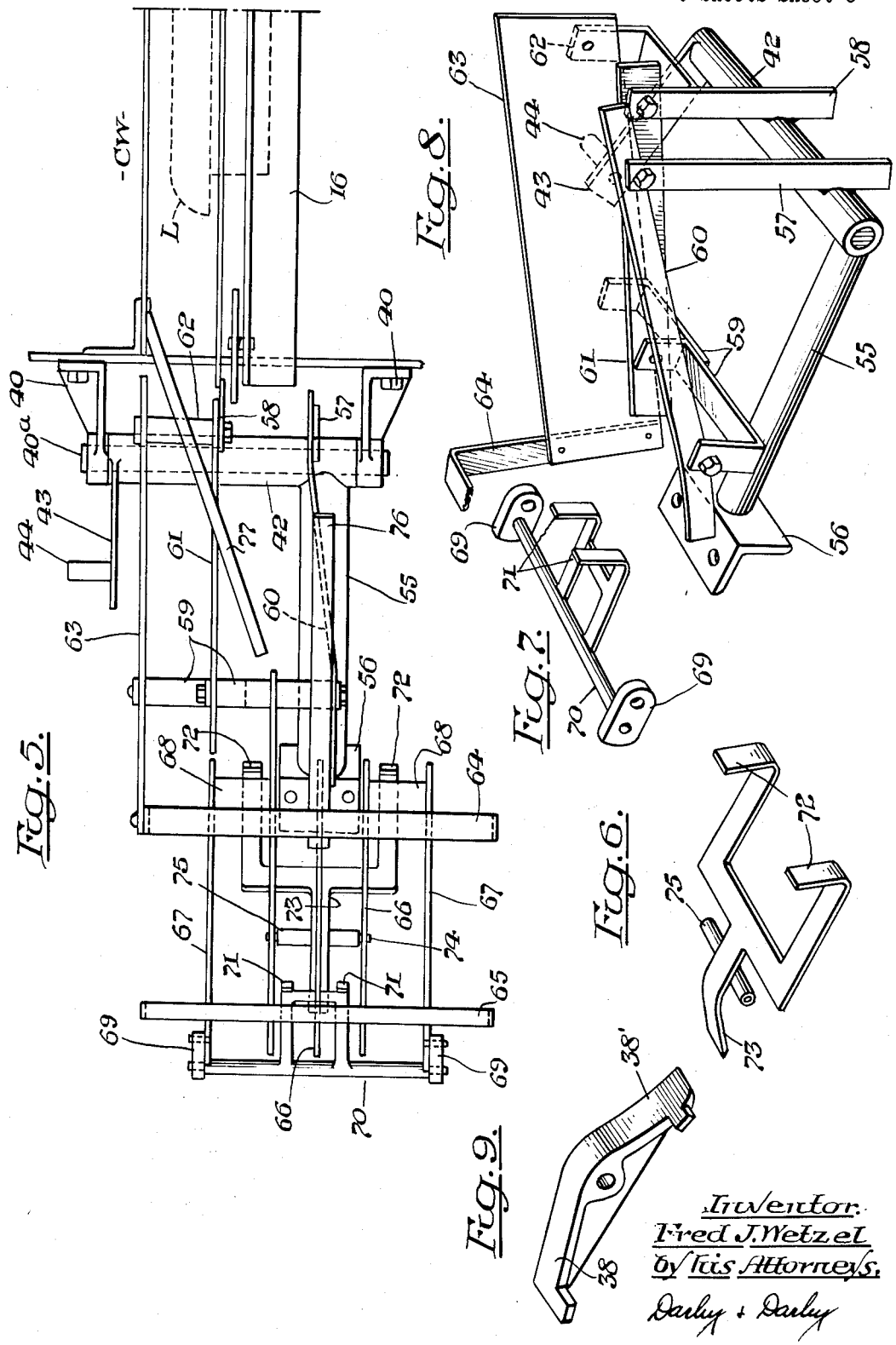

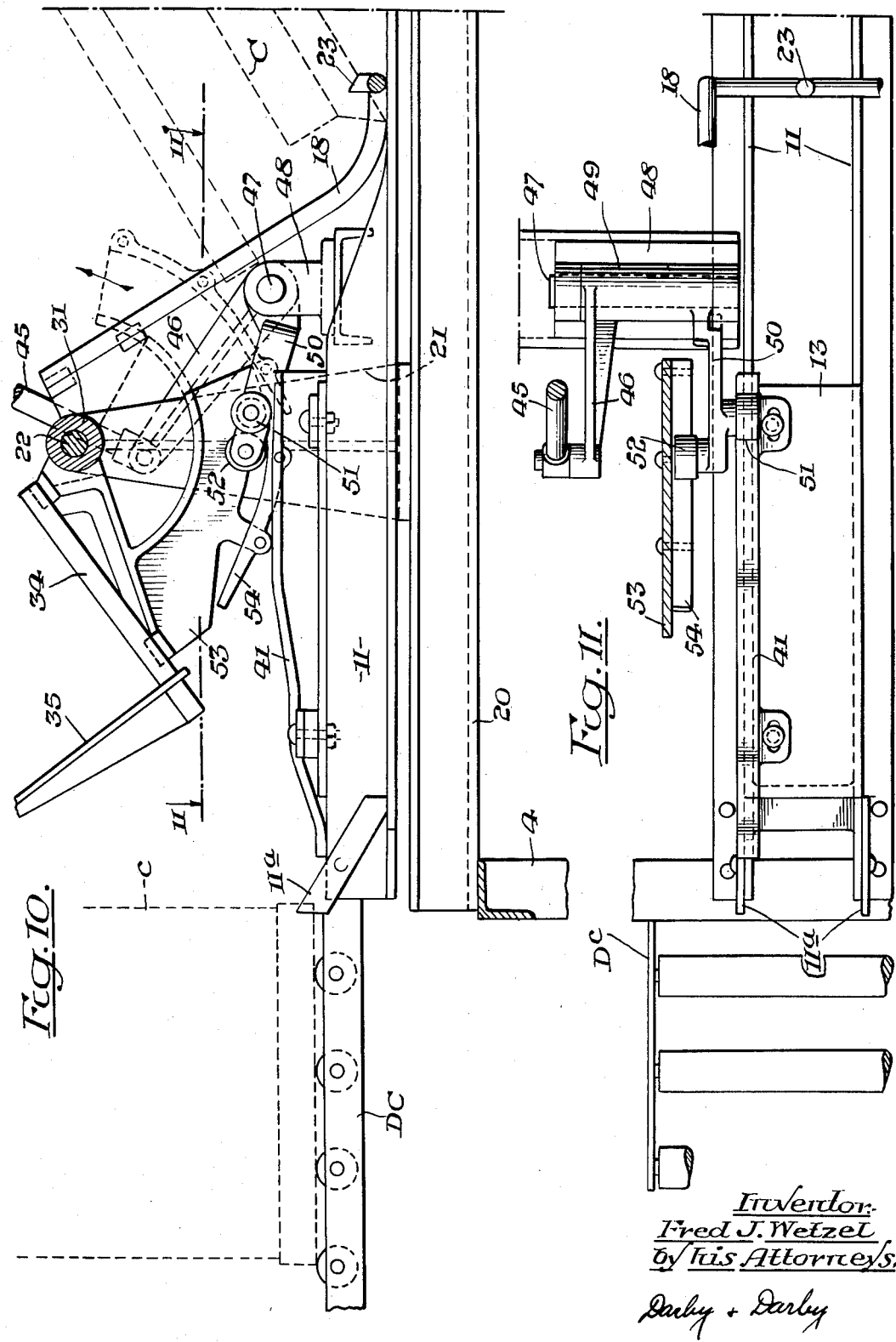

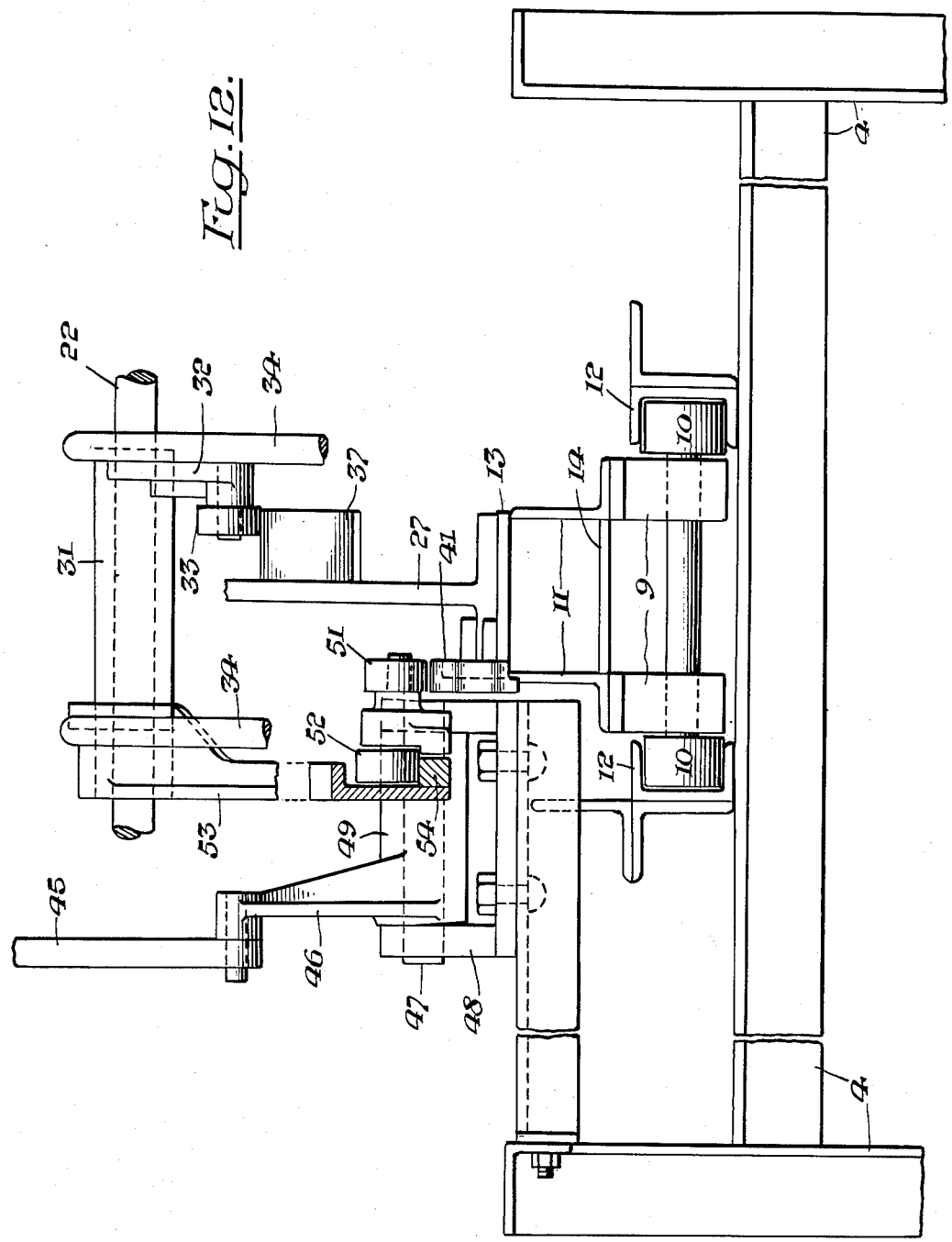

Nov. 15, 1955 F. J. WETZEL 2,723,792
MILK CAN UNLOADER AND RE-COVERING UNIT
Filed Sept. 19, 1952 9 Sheets-Sheet 9

Inventor:
Fred J. Wetzel
by his Attorneys,
Darby & Darby

United States Patent Office 2,723,792
Patented Nov. 15, 1955

2,723,792

MILK CAN UNLOADER AND RE-COVERING UNIT

Fred J. Wetzel, Buffalo, N. Y., assignor, by mesne assignments, to W. P. Equipment Corp., Buffalo, N. Y., a corporation of New York Application September 19, 1952, Serial No. 310,452

3 Claims. (Cl. 226—92)

This invention comprises improvements particularly by way of structural simplification of unloading devices such as are used with milk can washing machines whereby the unloader receives the washed cans in inverted position, uprights them, and applies the cover to them which is also delivered from the washing machine.

The unloader and re-coverer is of the general type shown, for example, in U. S. Patent No. 2,041,451, granted May 19, 1936, to E. R. Alling for Unloader for Washed Cans and Covers, and is concerned primarily with a structural simplification of this and similar devices.

One object of the invention is to provide a unit for use with a milk can washing machine of the straight line type which is structurally greatly simplified over similar commercial devices and therefore less expensive to build and maintain.

Another object of the invention is to provide a device such as shown in the above patent which will perform the same functions as well as an assembly containing a substantial reduction in the number of moving parts which comprise it.

Another object attained by the reduction in the number of parts is to provide a unit of this type which is smaller in overall dimensions and which is so constructed as to be operatively associated with present forms of commercial straight line milk can washing machines.

Other and more detailed objects of the invention will be apparent from the following description of the embodiments thereof illustrated in the attached drawings.

In the accompanying drawings.

Figure 2:
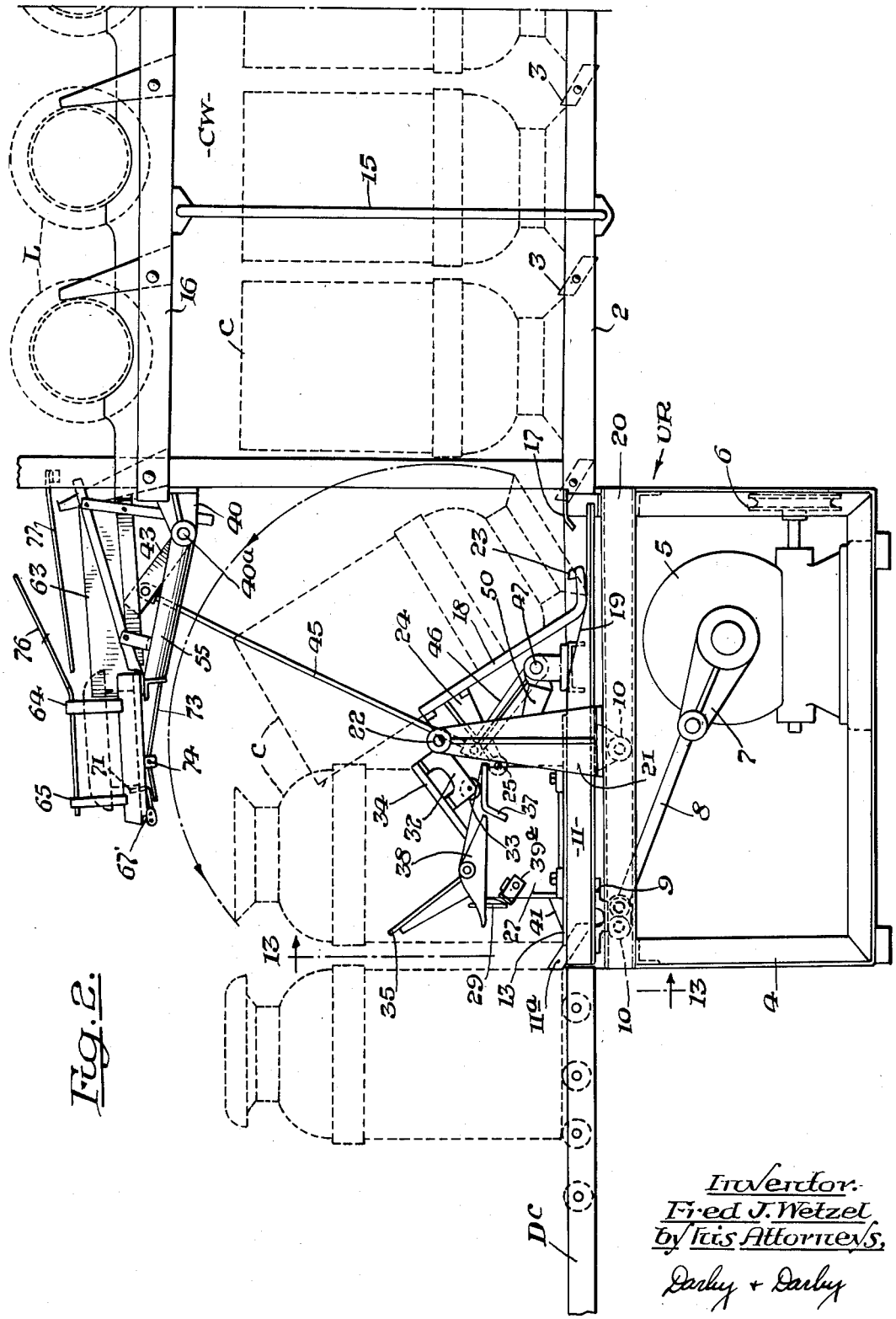
Figure 2 is a side elevational view of the structure of Figure 1 with some parts left out for simplicity, but showing in addition the can cover chute and its operating mechanism.
Figure 3:
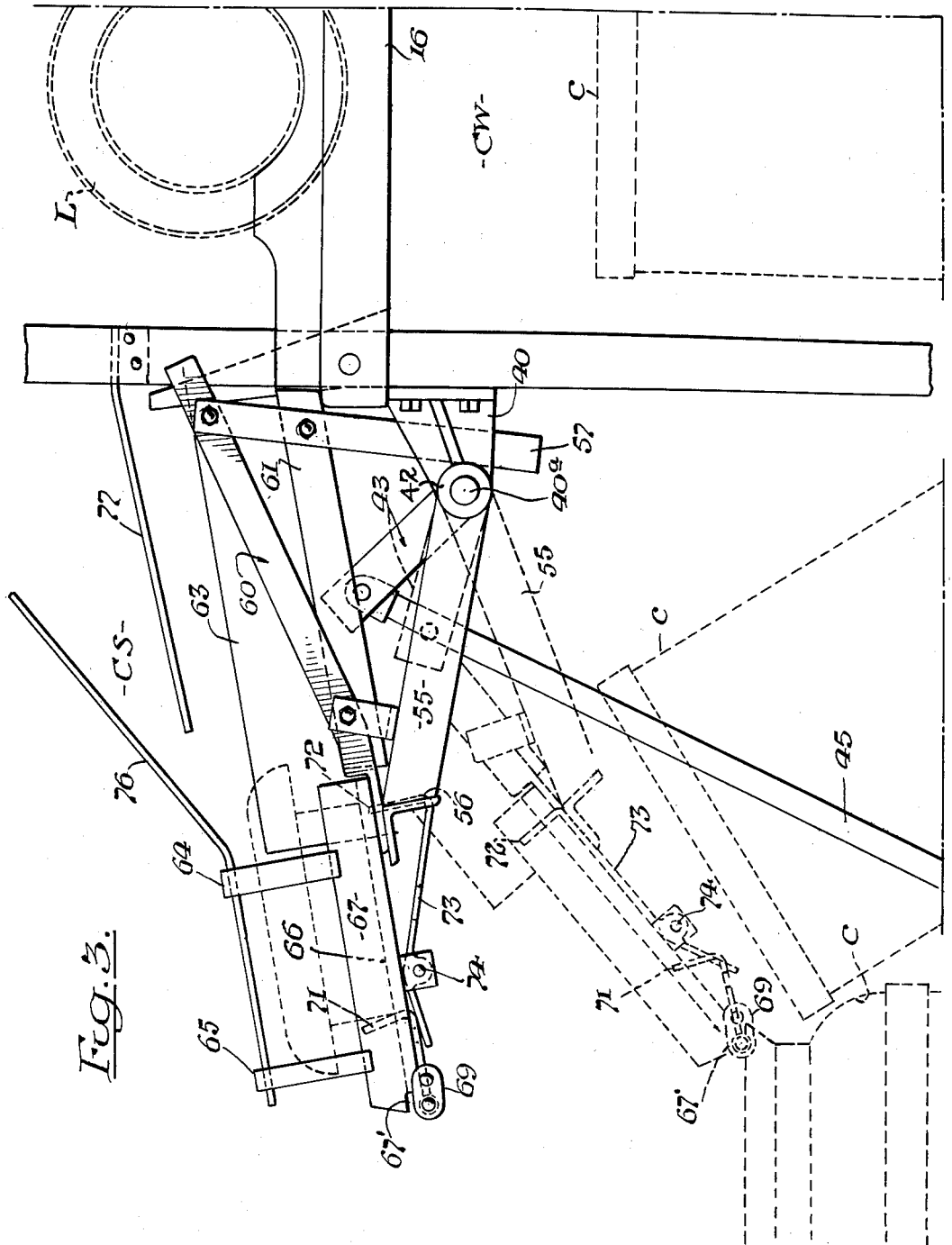
Figure 3 is an enlarged side elevational view of the can cover chute mechanism.
Figure 13:
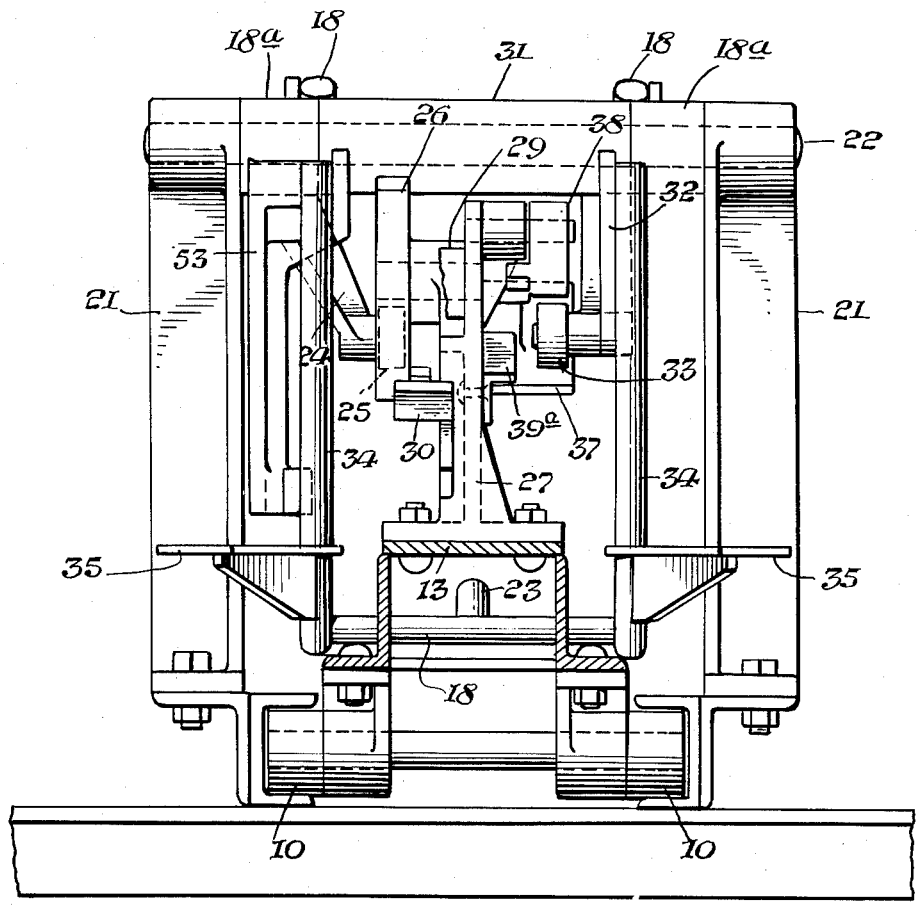
Figure 14:
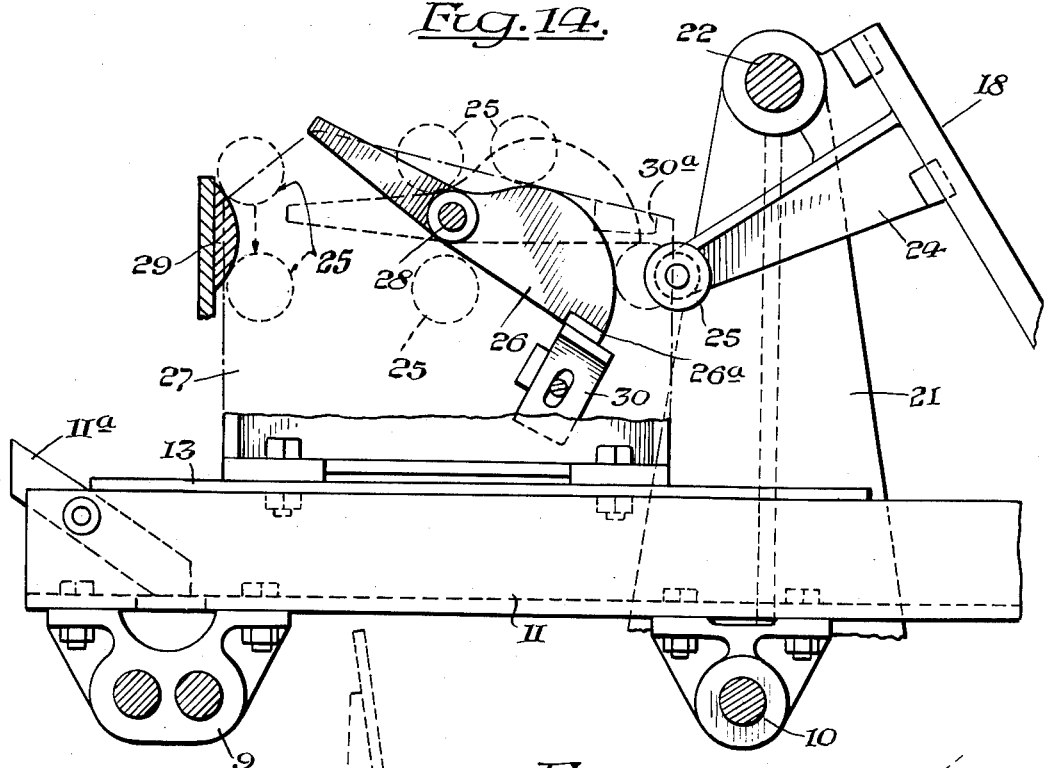
Figure 15:
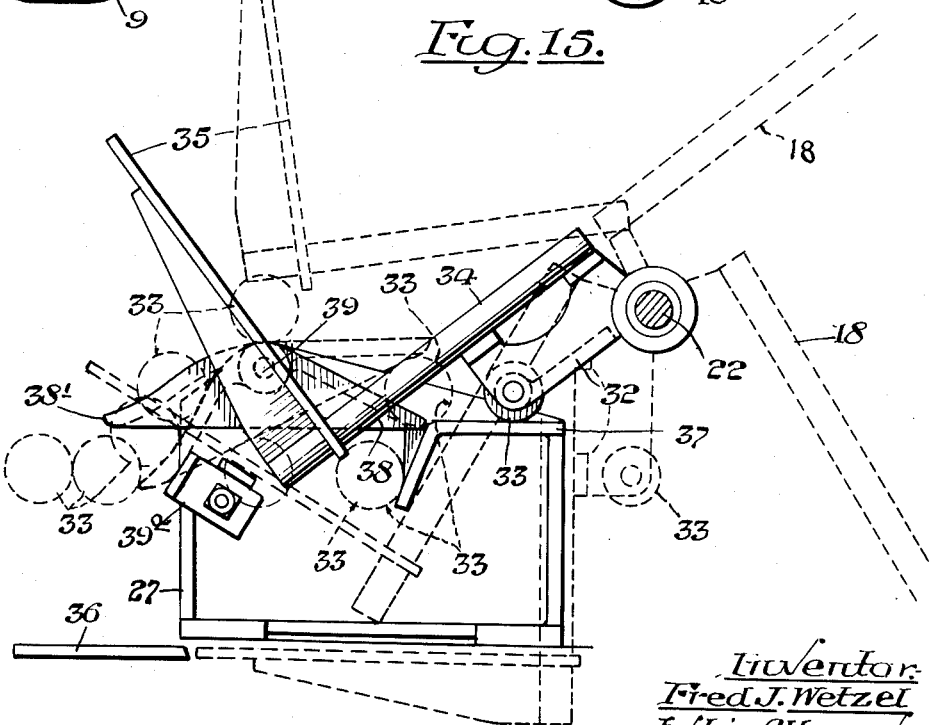

Figure 4, which is to be considered with Figure 3, is an enlarged side elevational view of the associated portion of the mechanism by means of which the can cover chute is operated with many unrelated parts omitted;

Figure 5 is a top plan view of the can cover chute mechanism;

Figures 6, 7 and 8 are detail perspective views of portions of the can cover chute;

Figure 9 is a perspective view of a cam forming part of the can cover chute operating mechanism;

Figure 10 is a detailed side elevational view of part of the can cover chute operating mechanism;

Figure 11 is a cross sectional view taken on the line 11—11 of Figure 10;

Figure 12 is a front elevational view with many parts broken away and omitted and some parts in cross section showing the relationship of portions of the operating mechanism for the can inverting portion of the device;

Figure 13 is a cross sectional view taken on the line 13—13 of Figure 2;

Figure 14 is an elevational view partly in section with some parts broken away and others shown diagrammatically of the part of the mechanism for uprighting the can; and Figure 15 is a more or less side elevational diagrammatic view showing various positions of the can uprighting mechanism comprising a can elevating cradle and a can lowering cradle.

As is well understood in this art, the processing of milk cans after use to prepare them for re-use involves the thorough cleaning and sterilizing of the cans and the covers or lids for them.

More commonly, the machine which is used for washing the cans and covers is arranged to cause them to move along a predetermined straight line path with the cans inverted and the associated lids standing on edge and travelling through the machine in this relation. The cans are advanced in a step-by-step motion to and from a series of washing and rinsing stations at which the various cleaning fluids are sprayed upwardly into the interiors thereof. At the same time the lids are sprayed and sterilized at corresponding stations and the sterile cans and covers reach the discharge end of the machine in this relationship.

It is likewise known in the art to associate with the washing machine, at its discharge end, an unloading unit which acts to return the cans to upright position, to deliver the lids respectively to the cans in position to close them, and to press them more or less tightly into place to seal them against contamination. The invention herein disclosed is concerned with the improvement in the unloading unit.

The discharge end of the can washer CW is diagrammatically illustrated in several of the figures, the unloading and inverting unit is generally indicated by the reference character UR and at DC is shown a conveyor onto which the unloading unit UR delivers the uprighted cans with the covers applied for delivery to storage or refilling points.

The milk cans are diagrammatically illustrated at C and the respective covers or lids at L.

As is well understood in the art, a straight line can washing machine includes a pair of parallel rails 1, a pair of reciprocable dog bars 2 having related pairs on pivotally mounted dogs 3 longitudinally spaced therealong. The spacing of the dogs is such that for each forward feeding stroke of the dog bars the cans C are advanced intermittently from station to station. Similarly, can lid-supporting reciprocable dog bars 16 are arranged to advance the respective lids at intermediate steps in association with the related cans.

The unloader unit includes a frame 4 of suitable strength and configuration made up for example of welded sections of angle iron or the like to support the unloading mechanism in a plane level with the rails of the washing machine as illustrated in Figure 2. Supported on this framework is a gear reduction unit 5 driven from any suitable power source by means of a drive belt pulley 6 and having a crank 7 secured to its output shaft. This crank is connected by a link 8 to a depending bracket 9 secured to the bottom of an assembly which includes effective extensions of the dog bars 2. These extensions comprise a pair of bars 11 in the form of angle irons (see Figures 1, 2 and 12) which are united at the top and bottom by steel plates 13 and 14. The angle irons 11 and plates 13 and 14 are united in any suitable manner as by welding to form a unitary structure to the bottom of which the brackets 9 are attached. These brackets support a shaft (see Figure 12) on the ends of which guide and supporting rollers 10 are mounted. These rollers travel in angle irons 12 forming part of the framework 4. The brackets 9 are at the discharge end of the dog bar assembly and additional brackets having guide rollers 10 are provided in spaced relation thereto as indicated in Figures 2 and 4 so as to smoothly guide reciprocation of the assembly.

The dog bars 2 are provided with a stiff leg connection 15 to the lid dog bars 16, as is well known in this art, so that the two sets of dog bars 2 and 16 will reciprocate together. At the discharge end of the can washer CW on the level with the rails 1 is a fixed cam tilting plate 17 onto which the dog bars push the cans beyond their point of balance and from which they are tipped counterclockwise (see Figure 2) into the framework 18 comprising a lifting cradle.

The lifting cradle 18 is pivotally mounted on a shaft 22 which is journalled in a pair of uprights 21 secured to the framework 4. The lifting cradle 18 is of U-shaped formation and at its open end is secured in any suitable manner to a pair of collars 18ᵃ (see Figure 1) which are pinned to the shaft 22. The base of the frame is provided with a lug 23 (see Figure 2) over which the lip of the can drops as it is tilted by the plate 17 to prevent the can from slipping out of the cradle, especially by reason of rebound.

The cradle 18 includes a lateral extension 24 which terminates in a cam follower roll 25 positioned to cooperate with a pivotally mounted cam 26. The cam 26 is pivotally mounted at 28 by a transverse pivot pin secured to a support 27 which is attached to the plate 13 of the dog bar extension assembly (see Figure 4). Cam 26 has a lateral lug 26ᵃ which cooperates with an adjustable stop 30 secured to the support 27. In its foremost clockwise position (see Figure 14) and a fixed stop 30ᵃ formed on the support 27 for limiting its rotation in a counterclockwise direction. A fixed cam surface 29 is mounted on the support 27 and cooperates with the cam follower 25 when it is in the region of its location as will be explained later.

The lifting cradle 18 delivers the cans to a lowering cradle which consists of a sleeve 31 rotatably mounted on the shaft 22 and a pair of parallel arms 34 terminating in feet 35. These arms are secured to the sleeve by welding for example. An arm 32 (see Figure 12) is also connected to this sleeve and is provided with a cam follower roll 33 which cooperates with a fixed knee cam 37 secured to one side of the support 27. A pair of platform plates 36 are mounted on the structure in a position to be in the plane of the feet 35 when the lowering cradle has completed its counterclockwise movement to bring the can to upright position. A cam 38, pivotally mounted at 39 on the support 27, is limited in its clockwise rotation by engaging a stop ledge on the end of the cam 37 (see Figure 4). The opposite end 38' of the cam 38 engages an adjustable fixed stop 39ᵃ to limit counterclockwise rotation of the cam. Stop 39ᵃ is mounted on the support 27.

The cover chute assembly CS and its operating mechanism is clearly seen in Figures 3, 4, and 5. A pair of brackets 40 are mounted on the end of the can washer CW adjacent the lid dog bars 16 and provide a support for a shaft 40ᵃ on which is rotatably mounted a sleeve 42 (see Figure 5). This sleeve is provided with an arm 43 having a pivot pin 44 to which the link 45 is pivotally connected at its upper end. The lower end of this link is pivotally connected to a lever 46 (see Figure 4) which has a sleeve 49 rotatably mounted on a shaft 47 supported in a bracket 48 which is mounted on the framework 4. The sleeve 49 has another integral arm 50 which provides a support for a pair of cam follower rolls 51 and 52. Cam follower 51 cooperates with a fixed cam 41 mounted on the plate 13 of the dog bar extension assembly (see Figure 10). Cam follower roller 52 cooperates with an arcuate cam 54 attached to the extension arm 53 which in turn is secured to the sleeve 31 (see Figures 10, 11 and 12).

Turning to Figure 5, it will be seen that sleeve 42 has a rigid arm 55 terminating in an angle fixture 56. Welded to the sleeve 42 are a pair of uprights 57 and 58 which support at their upper ends one end of each of the rails 60 and 61 respectively. The lower ends of these rails are supported on a bracket 59 which extends transversely of the arm 55 and is rigidly secured thereto. These parts are arranged so that the longer rail 60 has a sharper inclination to the horizontal than the companion rail 61. The bracket 59 has a further extension for supporting one end of a guard wall or plate 63, the other end of which is attached to a lateral bracket extension 62 of the upright 58 as clearly shown in Figure 8.

The guard plate 63 serves to support one end of the generally U-shaped yoke 64 which, together with a similar yoke 65, form a guard through which the can cover may move without escaping from the structure. The yokes 64 and 65 are attached to the side plates 67 which in turn are supported from the angle fixture 56 by means of the plates 68. All these various members are normally of metal and can be welded or otherwise secured together into a unitary framework.

Pivotally attached to the outer ends of the side plates 67 are a pair of short arms 69 between which a long tubular sleeve 70 extends and which is mounted on a shaft secured in these arms. As shown in Figure 7 the sleeve 70 has a pair of upstanding fingers 71 arranged for swinging movement between a pair of rails 66 which are also secured to the angle plate fixture 56 in any suitable manner so as to lie in fixed parallel relation. A similar pair of fingers 72 at the terminal ends of a U-shaped yoke having a tail piece 73 are secured to a sleeve 75 which is rotatably mounted on a shaft 74, mounted in the rails 66. It will be noted that the tail piece 73 is downwardly curved from the plane of the yoke and lies under a bridging member interconnecting and bracing the fingers 72 (see Figure 5). Secured to the yokes 64 and 65 is a guard bar 76 having an upwardly inclined end which lies more or less centrally of the rail 66. Attached in any suitable manner to the framework of the can washer CW is a tilting bar 77 which extends transversely of the longitudinal path of the can covers as they issue from the washing machine. At the discharge end of the unit is any suitable form of conveyor DC over which the cans move to a point of storage or refilling.

Having referred in detail to the various parts of the mechanism comprising the complete unit, and having set out the general relationship of these parts, their functional relationship will become apparent from the following detailed description of the operation of this mechanism.

Figure 1:
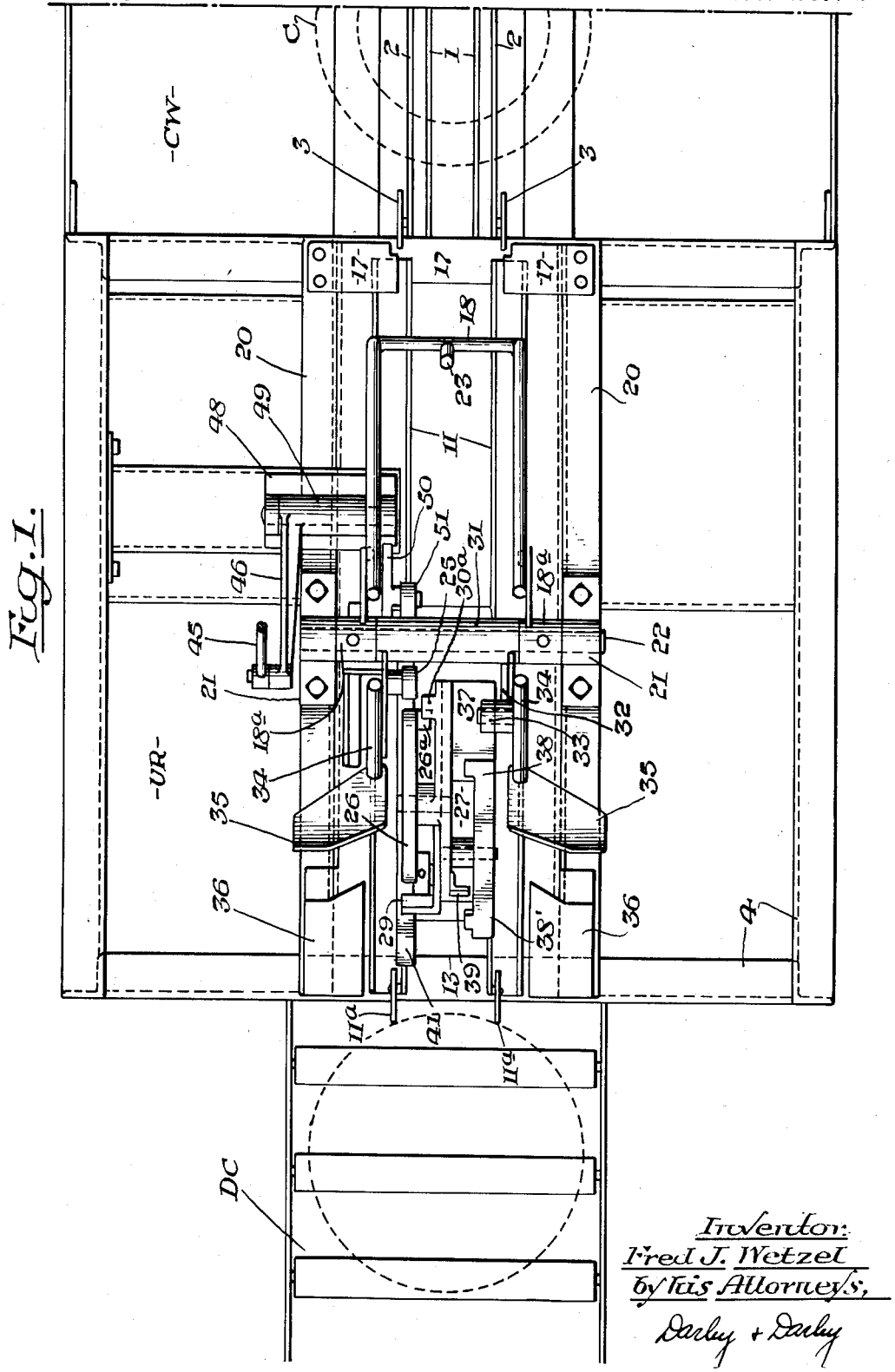
Figure 1 is a plan view of that portion of the unit which receives milk cans from the washing machine in inverted position and uprights them.

Figure 4 shows a lifting and lowering cradle and the associated mechanism in what can be called starting position at which time the dog bars 2 and the dog bar extension assembly 11 are at the end of the feeding stroke which is the same as saying that they are at the beginning of the return stroke. With reference to Figure 2 it will be noted that the operating crank 7, which is driven in a clockwise direction, is in such position, assuming that the dog bars are at the end of the forwarding stroke and at the beginning of the return stroke, as to effect completion of the return stroke more slowly than the forwarding stroke. This timing allots a larger portion of the complete cycle of the machine for the washing period, an obviously desirable condition. Understanding of course, as indicated in Figure 1, that the dog bars 2 are connected to the dog bar extension assembly 11 for conjoint movement, it will be seen that if the crank 7 revolves in a clockwise direction it will cause the extension unit 11 and the dog bars 2 to reciprocate in unison. Assuming, therefore, that the crank 7 starts to move from the position shown in Figure 2, the dog bars will move quickly to the right, remembering that the cans C stand on the rails 1 which may be slightly elevated above the top edges of the dog bars 2. It will be seen that the dog bars will move to the right without disturbing the position of the cans.

As the dogs 3 engage the can lips so that they are depressed and pass under the cans until they move to the right thereof whereby by gravity they can tip back to normal position as shown in Figure 2. As the crank continues to move it will reach a point where the dog bars will start to move to the left whereupon the dogs 3 will engage the can lips and cause them to slide to the left along the rails 1. The leading can will therefore be pushed onto the tipping ledge 17 and when it gets over center it will fall gently onto the cradle 18, the lug 23 resisting any tendency of the can to bounce out of the cradle. It will settle in the lifting cradle 18 in the position clearly shown in Figure 2. It will be noted that the dog bar extensions 11 have their profile cut away at 19 to provide a space into which the lip of the tipped can can move without interference.

During the next cycle as the dog bars begin their return stroke moving to the right (Figure 14) the cam 26 will of course move with them. This cam will be in tipped position as shown in Figure 14 due to the action of gravity so that its lug 26ª rests on fixed stop 30 as shown. When this cam moves approximately 1" it will move into contact with the cam follower roll 25. The stroke of the dog bars is approximately 16" so that at the end of 1/16 of the return stroke this engagement occurs. As the cam continues to move to the right it will apply a lifting force to the cradle 18 as the cam follower 25 follows a path defined by the outline of the cam. Thus the cradle 18 will begin to pivot in a counterclockwise direction about the axis of shaft 22. When the pivot point of cam 28 reaches a position just to the right of cam follower 25 the can will be tilted to a substantially horizontal position at which the lug 26ª will engage the fixed stop 30ª corresponding to the dotted position of this cam as shown in Figure 14. As the dog bars continue their return stroke the cam will move under the cam follower 25 which action will continue until the cam 29 engages it. By this time the cradle 18 will have completed its counterclockwise rotation and will be in the position shown in Figure 15, that is, it will lie in the same plane with the arms 34 of the lowering cradle and the can will slide bottom first onto this cradle until it rests against the feet 35. The lowering cradle will be in the position shown in Figure 15 at this time by an action to be later described.

When cam 26 moves from under cam follower 25 it will fall by gravity to the full line position shown in Figure 14. Upon the return stroke of the dog bars this cam will pass over the cam follower 25 and the parts will ultimately return to the full line position shown in Figure 14. The path of travel of the cam follower 25 is indicated by the successive positions represented by the dotted circles 25 in Figure 14. It is clear therefore that for each cycle of the dog bars the lifting cradle 18 receives a can, tips it up until it can slide onto the lowering cradle, and then returns into position to receive the next can.

The same cycle of movement of the cam support 27 which carried the cam 26 through this cycle also controls the raising and lowering of the lowering cradle 34. When the dog bars are at the beginning of the return stroke the cam follower 33 which controls the lowering cradle is resting on the knee cam 37. As the dog bars move to the right on the return stroke the lowering cradle remains in the full line position shown in Figure 4 until the cam follower 33 is engaged by cam 38 the right hand end of which rests on a ledge which forms a part of the knee cam.

As the dog bars continue their return stroke the inclined forward edge of cam 38 engages cam follower 33, the lowering cradle moves clockwise to its highest most position as shown in Figure 15 at which time the follower 33 is vertically over the axis of the pivot pin 39 for the cam 38. Further movement of the dog bars to the right permits the lowering cradle to slowly descend as its cam follower 33 rides down the sloping tail end 38' of the cam 38 which is gradually tipped to the dotted position shown in Figure 15 until the latter lug on that cam engages the stop 39ª. It may be noted for clarity, as shown in Figure 9, that cam 38 has a lateral lug at each end, one at the end 38' cooperating with the stud 39ª and the one at the other end cooperating with the ledge on the knee cam 37. When cam follower 33 reaches its lowermost position, as shown in Figure 15, the feet 35 of the lowering cradle will be just below the plane of the landing plates 36 (see Figure 15) so that the can rests on these plates which are fixed on the frame 4. The feet 35 are so shaped that they receive the can so that it can thus be deposited on these receiving plates. As the return stroke of the dog bars continues feet 35 will move out from under the can and the dogs 11ª will ultimately move to the right side of the can lip. During this further movement the end 38' of cam 38 will move away from the follower 33 and the cam can rotate in a clockwise direction back to its normal position against the ledge on the knee cam 37 which is the full line position shown in Figure 15. Upon the forwarding stroke of the dog bars it will be seen that cam follower 33 is below cam 38 and can pass under it as indicated in Figure 15, until it is engaged by the inclined face of the knee cam 37. As the forwarding stroke is completed, the lowering cradle will be lifted as follower 33 is forced up the incline of the knee cam and onto its horizontal portion. This causes the lowering cradle to be raised to the full line position shown in Figure 15. As the cam follower 33 moves up over the knee of the cam 37 it engages the under surface of cam 38 and raises it so that the follower can move onto the horizontal portion of the cam 37 without interference from cam 38. The various positions of the cam follower 33 throughout a full cycle of the dog bars is indicated by the various dotted circles 33 in Figure 15.

During the forwarding stroke the dog bars of course move to the left and so the dogs 11ª move the previously deposited can from the receiving platform 36 onto the conveyor DC, prior to the clockwise rotation of the lowering cradle to the starting position.

During these operations the cover chute mechanism is also operated. The cam cover dog bars 16, being tied to the cam dog bars 2 by the stiff leg connection 15, move with them. Thus as a can is discharged from the washer onto the lifting cradle 18 its lid is discharged by the dog bars 16 into the lid chute. As illustrated in several of the figures the lids L move through the washer in a vertical position so they are pushed onto the can chute rails 60 and 61 in that position. However, they are engaged by the tilting bar 77 which causes them to tip over so that the flange of the cover ultimately rides down the top edges of the rails 60 and 61. The higher end of rail 60 prevents the cover from falling over with a bang as it is tipped by the bar 77 but gradually permits the cover to attain a horizontal position by reason of the greater inclination of the rail 60 with respect to the rail 61. Thus as the can moves onto the rails 66 and 67 (see Figure 5) it attains a horizontal position. However, its movement through the chute is first arrested when it engages the fingers 72. During these operations the cover chute is pivoting on the axis of shaft 40ª. This pivoting action results from the movement of cam 41 with the dog bar extensions 11.

At the beginning and for a period thereafter of the return stroke of the dog bars, the cam follower 52 mounted on the lever 50 engages upon the cam 54 which is mounted on the bracket 53 which is attached to and moves with the lowering cradle. While the cam follower 52 is in engagement with cam 54, cam follower 51, also mounted on the lever 50, is held just off the cam surface of cam 41. Thus during the lowering action of the cradle 34 the cover chute CS is held in sufficiently raised position so that the can clears under it (see the arrowed broken line in Figure 2). However, as soon as the can is fully uprighted, that is, when the lowering cradle has completed its counterclockwise movement, cam follower 52 rides off the end of cam 54 allowing cam follower 51 to engage the cam 41 and be controlled by it. As the return stroke continues, cam 41 (see Figure 10) continues to move to the right and so cam follower 51 in effect follows the contour of cam 41 and lever 50 gradually descends to its lowermost point. As a result through the connections previously described the can cover chute CS is lowered until the tripping bar 70 engages the lip of the can which is still on the lowering cradle.

First it will be noted that during the time a can is delivered from the washer to the lifting and lowering cradles its cover is delivered into the can chute CS. It slides down the chute until it engages the fingers 71 which are normally in the raised position shown in Figure 3. These fingers are held in this position by the action of gravity on the yoke including the fingers 72. Under the action of gravity this yoke will be rotated clockwise until its tail piece 73 engages the bridge between the fingers 71 and rotates them to the raised position shown in Figure 3. As is further shown, the fingers 72 are retracted below the level of the rails 66 at which the can cover slides so that it will move into the position shown in Figure 3 and be stopped by the fingers 71. Therefore, when the cover chute CS is lowered, the tripping bar 70 will first engage the lip of the can and, as the chute moves still lower, the tripping bar will rotate on the pivotal supports for the arms 69 until the tripping bar engages the abutment 67' (see Figure 3) formed on the guard plates 67. The rotation of the tripping bar is clockwise causing the fingers 71 to move in the same direction to a point where they are retracted out of the path of the can cover releasing it so that it can slide into the mouth of the can. This movement of the fingers 71 will cause fingers 72 to be raised above the top edges of the cover rails 66 so that should another cover be accidentally delivered into the chute it will be held by the fingers 72 until the chute is raised whereupon fingers 72 will retract and fingers 71 will be projected to engage it.

These movements of the can chute are controlled by the cam 41 coacting with the cam follower 51 after cam 54 moves out of engagement with cam follower 52 as previously explained.

Upon the next forwarding stroke of the dog bars 2 and dog bar extensions 11 cam 41, acting on the follower 51, will raise lever 50 to the point where the can cover chute is at its uppermost position.

It will be understood that on each forwarding stroke of the dog bar extensions the dogs 11ª (see Figure 10) will advance an uprighted and covered can from the platforms 36 (see Figure 1) onto the delivery conveyor DC. The dogs 11ª are pivoted as indicated so that they can move back under the bottom of the next can on the return stroke of the dog bar extensions.

This mechanism does not disclose means for pressing the cover into the can, but this action can be included if required.

The above description comprises one embodiment of the herein disclosed invention, variations in the detail and construction of which can readily be made by those skilled in the art with departure from the subject matter defined in the claims. I prefer to be limited to the claims granted me rather than by the example of my invention herein disclosed.

What is claimed is:

1. The combination with a can washing machine having reciprocable dog bars for intermittently advancing the cans along a defined path, of a can inverting unit mounted in said path, comprising a pivoted lifting cradle and a pivoted lowering cradle and a cam assembly unit bodily reciprocable with said dog bars comprising a pair of cams for raising and lowering said lifting and lowering cradles respectively, whereby a can delivered into said lifting cradle by said dog bars is transferred to said lowering cradle and removed therefrom by said dog bars.

2. In the combination of claim 1, said cam assembly unit being secured to said dog bars to be reciprocated thereby.

3. In the combination of claim 1, a pivotally mounted can cover delivery means having a can trigger cover releasing stop, and means actuated by said can inverting unit to cause lowering and raising of said stop whereby a can cover is delivered into the mouth of each can after transfer into said lowering cradle.

References Cited in the file of this patent

UNITED STATES PATENTS

| | | |
|---|---|---|
| 1,247,692 | Lathrop | Nov. 27, 1917 |
| 1,366,933 | Pilley | Feb. 1, 1921 |
| 1,578,451 | McEwan | Mar. 30, 1926 |
| 1,649,073 | McEwan | Nov. 15, 1927 |
| 1,721,256 | Mitton | July 16, 1929 |
| 1,756,522 | Paulson | Apr. 29, 1930 |
| 2,041,451 | Alling | May 19, 1936 |
| 2,361,728 | Wolf | Oct. 31, 1944 |
| 2,369,742 | Klaiber | Feb. 20, 1945 |